Oct. 25, 1938. L. FINK 2,134,330
FLAT HEAD PLUG
Filed Aug. 14, 1936
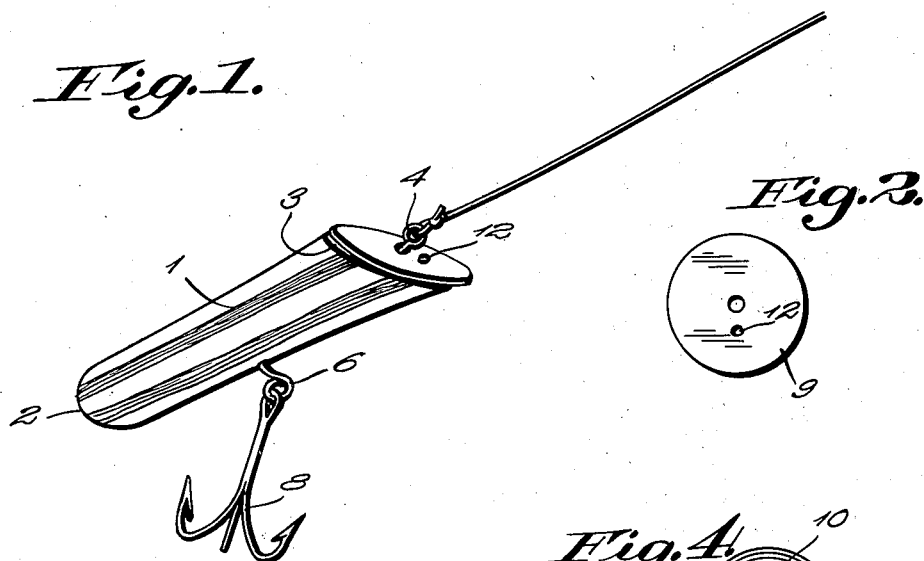
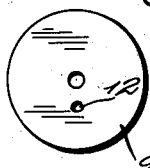
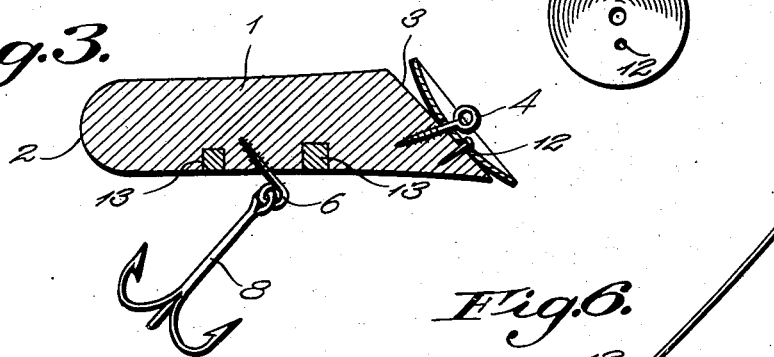
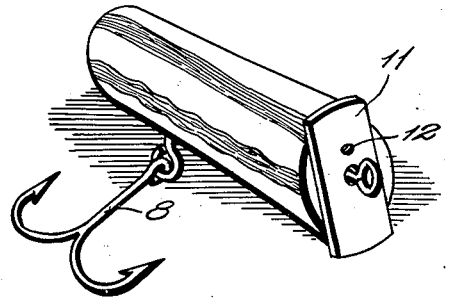
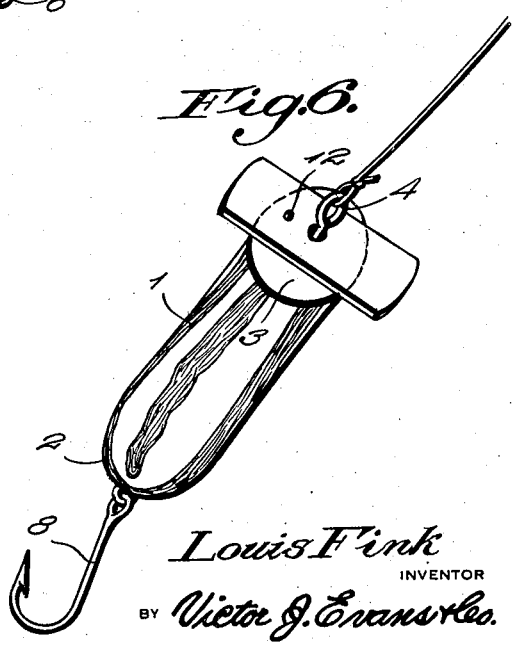
Louis Fink
INVENTOR Patented Oct. 25, 1938

2,134,330

UNITED STATES PATENT OFFICE 2,134,330

FLAT HEAD PLUG

Louis Fink, Cut Bank, Mont.

Application August 14, 1936, Serial No. 96,111

1 Claim. (Cl. 43—46)

This invention relates to artificial bait and has for the primary object the provision of a device of the plug type which has one end shaped to provide a flat face or head and attachable thereto are mediums for varying the action of the plug in the water to cause the latter to either travel close to or on the surface of the water with a wabbling action or to travel deep or at a maximum distance under the water whereby a person may easily adjust the device either for shallow or deep trolling or for casting along the surface of the water.

With these and certain other objects in view, this invention consists in certain novel features of construction, combination and arrangement of parts to be hereinafter more fully described and claimed.

For a complete understanding of my invention, reference is to be had to the following description and accompanying drawing, in which—

Figure 1 is a perspective view illustrating artificial bait constructed in accordance with my invention.

Figure 2 is a plan view illustrating the circular-shaped disc.

Figure 3 is a vertical sectional view illustrating the plug with a concaved disc secured to one end thereof.

Figure 4 is a plan view illustrating the concaved disc.

Figure 5 is a perspective view illustrating an oblong or an elongated disc secured to the plug.

Figure 6 is a view similar to Figure 5 showing the oblong or elongated plate and adjusted in a position at right angles to that shown in Figure 5.

Referring in detail to the drawing, the numeral 1 indicates a plug or body constructed of any material suitable for the purpose and has one end rounded, as shown at 2, and its opposite end cut at an inclination to form a flat face or head 3 to which is secured a line attaching eye 4. An eye element 6 is secured to the under side of the plug or body to which hooks 8 are connected. The plug or body gradually tapers from the face 3 to the rounded end 2. The line attaching eye is employed for securing to the flat face or head 3 of the plug either discs 9, 10 or 11. The disc 9 is of circular shape and flat while the disc 10 is of circular concaved shape and is shown applied to the face 3 and in Figure 3. The plate 11 is oblong or of elongated shape. The disc 10 being concaved will cause the plug 1 to have a greater wabbling action when drawn through the water than the disc 9. The plate or disc 11 when employed on the plug or body 1, as shown in Figure 5, will cause the plug to travel at a maximum depth within the water and when positioned on the plug, as shown in Figure 6, the plate or disc will cause said plug to travel near or upon the surface of the water with an extreme amount of wabbling action.

In order to secure the disc or plate 11 in its different positions it is provided with an opening 12 through which may pass a pin for insertion into the plug or body. The opening 12 is concentric to the opening which receives the line attaching eye 4.

The under face of the plug or body has sockets opening outwardly thereof and are indicated by the character 13. Lead wool or similar material may be placed in said sockets for varying the weight of the device in entirety so that it may be caused to travel in the water near the surface or at a greater depth when desired. The amount of weight may be varied to suit different fishing conditions. When not employing the lead wool, the sockets 13 may be filled with cork.

The discs 9 and 10 may be provided with openings 12 to receive pins for securing the discs to the plug or body 1 against rotation. The openings 12 in said discs are arranged eccentrically of the openings which receive the line securing eyes 4.

Having described the invention, I claim:

An artificial bait, comprising a plug having one end beveled to a flat head, hooks pivoted to the underside of said plug, a line attaching member secured to said plug, a rotatable plate secured to said flat head by said member, and a pin for maintaining said plate in adjusted position relative to said head whereby to vary the action of said plug in the water.

LOUIS FINK.